US011888153B2

(12) United States Patent
Ahn et al.

(10) Patent No.: US 11,888,153 B2
(45) Date of Patent: Jan. 30, 2024

(54) METHOD FOR PREPARING POSITIVE ELECTRODE ACTIVE MATERIAL FOR SECONDARY BATTERY, POSITIVE ELECTRODE ACTIVE MATERIAL THUS PREPARED AND LITHIUM SECONDARY BATTERY INCLUDING THE SAME

(71) Applicant: LG Chem, Ltd., Seoul (KR)

(72) Inventors: Dong Joon Ahn, Daejeon (KR); Moon Kyu Cho, Daejeon (KR); Sung Soon Park, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/459,344

(22) Filed: Aug. 27, 2021

(65) Prior Publication Data
US 2021/0391571 A1  Dec. 16, 2021

Related U.S. Application Data

(62) Division of application No. 16/481,718, filed as application No. PCT/KR2018/011579 on Sep. 28, 2018, now Pat. No. 11,189,827.

(30) Foreign Application Priority Data

Sep. 29, 2017 (KR) .................. 10-2017-0127757
Sep. 27, 2018 (KR) .................. 10-2018-0115214

(51) Int. Cl.
*H01M 4/36* (2006.01)
*H01M 4/485* (2010.01)
(Continued)

(52) U.S. Cl.
CPC ........... *H01M 4/366* (2013.01); *H01M 4/485* (2013.01); *H01M 4/62* (2013.01); *H01M 10/0525* (2013.01); *H01M 2004/028* (2013.01)

(58) Field of Classification Search
CPC ...................................... H01M 4/366
See application file for complete search history.

(56) References Cited

U.S. PATENT DOCUMENTS 4,975,548 A    12/1990 Brouilette et al.
2006/0222953 A1   10/2006 Inoue et al.
(Continued)

FOREIGN PATENT DOCUMENTS

CN    103098273 A    5/2013
CN    104521040 A    4/2015
(Continued)

OTHER PUBLICATIONS

International Search Report for Application No. PCT/KR2018/011579 dated Jan. 2, 2019, pp. 1-2.
(Continued)

*Primary Examiner* — Brian R Ohara
(74) *Attorney, Agent, or Firm* — Lerner David LLP

(57) ABSTRACT

A positive electrode active material, a positive electrode including the same, and a lithium secondary batter including the same are disclosed herein. In some embodiments, the positive electrode active material includes a lithium transition metal oxide, and a coating layer formed on a surface of the lithium transition metal oxide particle, wherein the coating layer is formed in a film form, and the coating layer includes a carbonized coating polymer and carbide.

11 Claims, 3 Drawing Sheets

(51) Int. Cl.
*H01M 4/62* (2006.01)
*H01M 10/0525* (2010.01)
*H01M 4/02* (2006.01)

(56) References Cited

U.S. PATENT DOCUMENTS

| | | |
|---|---|---|
| 2009/0214946 A1 | 8/2009 | Shen et al. |
| 2013/0071753 A1* | 3/2013 | Kim ............... H01M 4/525 |
| | | 429/231.95 |
| 2013/0244112 A1* | 9/2013 | Oh ................. H01M 4/625 |
| | | 429/223 |
| 2014/0113175 A1 | 4/2014 | Zhang |
| 2015/0017525 A1 | 1/2015 | Lee et al. |
| 2015/0132651 A1 | 5/2015 | Lee et al. |
| 2015/0243978 A1 | 8/2015 | Shon et al. |
| 2016/0036049 A1 | 2/2016 | Wang et al. |
| 2016/0351973 A1 | 12/2016 | Albano et al. |
| 2017/0149051 A1 | 5/2017 | Fujita et al. |
| 2017/0222272 A1* | 8/2017 | Takami ........... H01M 4/5825 |

FOREIGN PATENT DOCUMENTS

| | | |
|---|---|---|
| CN | 105633362 A | 6/2016 |
| CN | 106410137 A | 2/2017 |
| CN | 106450205 A | 2/2017 |
| IN | 101515640 A | 8/2009 |
| JP | H03222219 A | 10/1991 |
| JP | 2016186933 A | 10/2016 |
| JP | 2017084719 A | 5/2017 |
| JP | 2017103207 A | 6/2017 |
| KR | 20120026466 A | 3/2012 |
| KR | 20130030102 A | 3/2013 |
| KR | 20140039208 A | 4/2014 |
| KR | 20150009115 A | 1/2015 |
| KR | 20150050152 A | 5/2015 |
| KR | 20150099219 A | 8/2015 |
| KR | 20160042622 A | 4/2016 |
| WO | 2017034656 A1 | 3/2017 |

OTHER PUBLICATIONS

Search Report from Office Action for Chinese Application No. 201880008691.6 dated Apr. 30, 2021; 3 pages.

* cited by examiner

METHOD FOR PREPARING POSITIVE ELECTRODE ACTIVE MATERIAL FOR SECONDARY BATTERY, POSITIVE ELECTRODE ACTIVE MATERIAL THUS PREPARED AND LITHIUM SECONDARY BATTERY INCLUDING THE SAME

CROSS-REFERENCE TO RELATED APPLICATIONS

The present application is a divisional of U.S. application Ser. No. 16/481,718, filed on Jul. 29, 2019, which is a National Stage Entry under 35 U.S.C. § 371 of International Application No. PCT/KR2018/011579 filed on Sep. 28, 2018 which claims priority from Korean Patent Application No. 10-2017-0127757, filed on Sep. 29, 2017, and No. 10-2018-0115214, filed on Sep. 27, 2018, the entire contents of which are incorporated herein by reference.

TECHNICAL FIELD

The present invention relates to a method for preparing a positive electrode active material for a secondary battery, a positive electrode active material thus prepared and a lithium secondary battery including the same.

BACKGROUND ART

In recent years, with the rapid spread of electronic devices using batteries, such as mobile phones, notebook computers, and electric vehicles, demands for secondary batteries, which are small in size, light in weight and relatively high in capacity, have been rapidly increased. Particularly, a lithium secondary battery is light in weight and has high energy density, so that it has attracted attention as a driving power source for portable devices. Accordingly, research and development efforts for improving the performance of the lithium secondary battery have been actively conducted.

In the lithium secondary battery in which an organic electrolyte solution or a polymer electrolyte solution is filled between a positive electrode and a negative electrode, which are respectively composed of active materials capable of intercalating and deintercalating lithium ions, electric energy is produced by oxidation and reduction reactions when the lithium ions are intercalated/deintercalated into/from the positive and negative electrodes.

A lithium cobalt oxide ($LiCoO_2$), a lithium nickel oxide ($LiNiO_2$), a lithium manganese oxide ($LiMnO_2$ or $LiMn_2O_4$, etc.), a lithium iron phosphate compound, and the like are mainly used as the positive electrode active material for the lithium secondary battery. Also, as a method for improving low thermal stability while maintaining excellent reversible capacity of the $LiNiO_2$, a method of substituting a portion of nickel (Ni) with cobalt (Co) or manganese (Mn) has been proposed. However, this method of using $LiNi_{1-\alpha}Co_\alpha O_2$ ($\alpha$=0.1-0.3), in which a portion of Ni is substituted with Co, exhibits excellent charge/discharge and life-time characteristics, but has low thermal stability. On the other hand, a method of using a nickel-manganese-based lithium composite metal oxide, in which a portion of Ni is substituted with Mn having excellent thermal stability, and a nickel-cobalt-manganese-based lithium composite metal oxide (hereinafter, simply referred to as an 'NCM-based lithium oxide'), in which a portion of Ni is substituted with Mn and Co, are advantageous in relatively excellent cycle characteristic and thermal stability.

In recent years, demands for a secondary battery having higher capacity and higher energy density have been gradually increased, and attempts to achieve the target energy density by making a secondary battery have a higher voltage by expansion of the driving voltage range have been made. Accordingly, development of a high voltage-resistant positive electrode active material having reliability and stability under the condition of a charging voltage of 4.35 V or higher, which is higher than that of 4.3 V in conventional batteries, has been required.

Particularly, in a high voltage state, there are problems of an increase in side-reaction with an electrolyte solution, life-time characteristic deterioration and resistance increase due to formation of a solid electrolyte interface (SEI) film on the surface of a positive electrode active material, so that development of an improved positive electrode active material is needed.

DISCLOSURE OF THE INVENTION

Technical Problem

An aspect of the present invention provides a high voltage-resistant positive electrode active material for a secondary battery, which may suppress side-reaction with an electrolyte solution and formation of a solid electrolyte interface (SEI) film on the surface of a positive electrode active material under a high voltage condition, and thus have improved resistance and life-time characteristics.

Technical Solution

According to an aspect of the present invention, there is provided a method for preparing a positive electrode active material for a secondary battery, the method including: providing a lithium transition metal oxide; forming a mixture by mixing the lithium transition metal oxide, a coating polymer, and carbide; and heat-treating the mixture to form a coating layer including a carbonized coating polymer and carbide on the surface of the lithium transition metal oxide particle.

According to another aspect of the present invention, there is provided a positive electrode active material for a secondary battery, the positive electrode active material including: a lithium transition metal oxide; and a coating layer formed on the surface of the lithium transition metal oxide particle, wherein the coating layer is formed in a film form, and the coating layer includes a carbonized coating polymer and carbide.

According to another aspect of the present invention, there are provided a positive electrode and a lithium secondary battery each including the positive electrode active material.

Advantageous Effects

According to the present invention, a high voltage-resistant positive electrode active material for a secondary battery may be prepared, which suppresses side-reaction with an electrolyte solution and formation of a solid electrolyte interface (SEI) film on a surface of a positive electrode active material under a high voltage condition, and thus has improved resistance and life-time characteristics.

A positive electrode active material for a secondary battery according to the present invention may prevent mechanical breakage thereof occurring during repetition of charge/discharge in a high voltage state. In addition, on the entire surface of the positive electrode active material particle may be uniformly coated, and the initial resistance and increase rate of resistance may be reduced by ensuring excellent electric conductivity.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
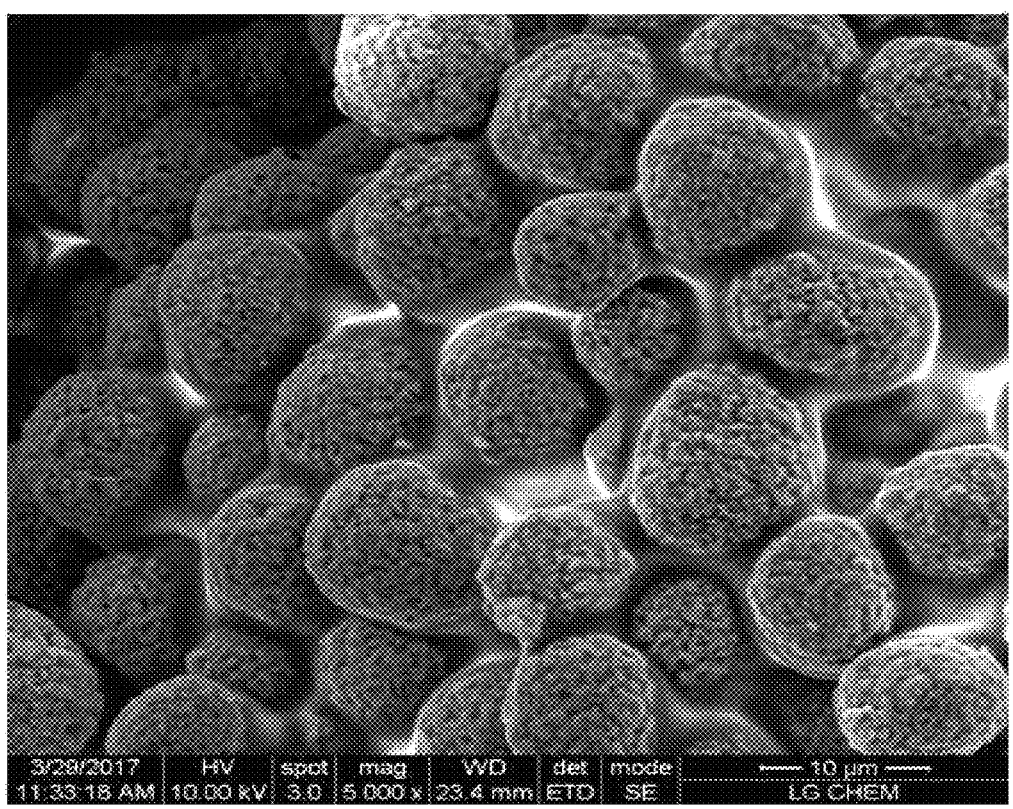
FIGS. 1 and 2 are scanning electron microscope (SEM) images of a positive electrode active material prepared in Example 1 on an enlarged scale.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing a positive electrode active material for a secondary battery of the present invention includes: providing a lithium transition metal oxide; forming a mixture by mixing the lithium transition metal oxide, a coating polymer, and carbide; and forming a coating layer containing the carbonized coating polymer and carbide on the surface of the lithium transition metal oxide particle by heat-treating the mixture.

By coating the lithium transition metal oxide particle using the mixture of the coating polymer and carbide, the positive electrode active material for a secondary battery according to the present invention may suppress side-reaction with an electrolyte solution and formation of a solid electrolyte interface (SEI) film on the surface of the positive electrode active material under a high voltage condition, and thus have improved resistance and life-time characteristics. In addition, by using the coating polymer made of a soft material, it is possible to prevent mechanical breakage of the positive electrode active material occurring during repetition of charge/discharge in a high voltage state. Furthermore, by using the carbide having excellent electric conductivity, the initial resistance and increase rate of resistance may be reduced by ensuring excellent electric conductivity. By carbonizing the coating polymer through the heat-treatment in the coating process, additional electric conductivity may also be ensured.

The method for preparing the positive electrode active material for a secondary battery of the present invention will be described in detail step by step below.

First, a lithium transition metal oxide is provided.

A lithium transition metal oxide typically used as a positive electrode active material may be used, and more preferably a lithium transition metal oxide containing cations of at least one transition metal selected from the group consisting of nickel (Ni), cobalt (Co), and manganese (Mn) may be used. For example, a layered-compound (e.g., a lithium cobalt oxide ($LiCoO_2$), a lithium nickel oxide ($LiNiO_2$), etc.), a lithium manganese oxide, such as $LiMnO_3$, $LiMn_2O_3$, and $LiMnO_2$, represented by the formula $Li_{1+x1}Mn_{2-x1}O_4$ (wherein, x1 is 0 to 0.33), a Ni-site type lithium nickel oxide represented by the formula $LiNi_{1-x2}M^1{}_{x2}O_2$ (wherein, $M^1$ is Co, Mn, Al, Cu, Fe, Mg, B or Ga, and x2 is 0.01 to 0.3), a lithium manganese complex oxide represented by the formula $LiMn_{2-x3}M^2{}_{x3}O_2$ (wherein, $M^2$ is Co, Ni, Fe, Cr, Zn or Ta, and x3 is 0.01 to 0.1) or $Li_2Mn_3M^3O_8$ (wherein, $M^3$ is Fe, Co, Ni, Cu or Zn), a lithium manganese complex oxide having a spinel structure represented by the formula $LiNi_{x4}Mn_{2-x4}O_4$ (wherein, x4 is 0.01 to 1) or $Li_2Mn_3M^3O_8$ (wherein, $M^3$ is Fe, Co, Ni, Cu or Zn), a lithium iron phosphate compound (e.g., $LiFePO_4$), etc. However, the present invention is not limited thereto, more preferably, the lithium transition metal oxide may include a lithium cobalt oxide (e.g., $LiCoO_2$), a lithium nickel oxide (e.g., $LiNiO_2$), a lithium manganese oxide (e.g., $LiMn_2O_4$), a lithium iron phosphate compound (e.g., $LiFePO_4$), etc.

Alternatively, the positive electrode active material may include a lithium transition metal composite oxide represented by following formula 1.

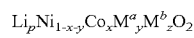

$$Li_pNi_{1-x-y}Co_xM^a{}_yM^b{}_zO_2 \quad \text{[formula 1]}$$

where $M^a$ is at least one element selected from the group consisting of Mn, Al and Zr, $M^b$ is at least one element selected from the group consisting of Al, Zr, Ti, Mg, Ta, Nb, Mo, W and Cr, and $0.9 \leq p \leq 1.5$, $0 \leq x \leq 0.5$, $0 \leq y \leq 0.5$ and $0 \leq z \leq 0.1$. More preferably, $0 \leq x+y \leq 0.7$ is satisfied, and most preferably, $0 \leq x+y \leq 0.4$ is satisfied. In addition, the positive electrode active material may be a high-Ni NCM-based positive electrode active material, in which the content of Ni in the total transition metal is 60 mol % or more. For example, the positive electrode active material may more preferably be a high-Ni NCM-based lithium transition metal oxide such as $LiNi_{0.8}Co_{0.1}Mn_{0.1}O_2$, $LiNi_{0.9}Co_{0.05}Mn_{0.05}O_2$, or $LiNi_{0.6}Co_{0.2}Mn_{0.2}O_2$.

Next, the lithium transition metal oxide, the coating polymer and the carbide are mixed to form a mixture.

Materials, which are possible to coat the surface of the lithium transition metal oxide particle and do not deteriorate the electrochemical performance, may be used as the coating polymer, and for example, the coating polymer may include at least one selected from the group consisting of polyvinylidene fluoride (PVDF), polyvinylpyrrolidone, polyethylene, polystyrene, polyethylene terephthalate, polyvinyl chloride, polyvinylidene chloride, an epoxy resin, an amino resin, a phenol resin and a polyester resin, more preferably at least one selected from the group consisting of polyvinylidene fluoride (PVDF), polyvinylpyrrolidone, polyethylene terephthalate and polyvinylidene chloride.

By using the coating polymer made of a soft material, it is possible to prevent mechanical breakage of the positive electrode active material that occurs by repetition of charge/discharge in a high voltage state. In addition, it is difficult to coat uniformly in a film form through the typical dry coating method of the metal oxide, which often results in an island form; however, according to the present invention, a method of coating with a mixture of the coating polymer and the carbide is capable of easily forming an uniform coating layer in a film form through temperature control during the coating process based on the melting point of the coating polymer, and also capable of uniformly distributing the carbide mixed with the coating polymer on the surface of the positive electrode active material particle. Furthermore, the coating polymer is carbonized through the heat-treatment during the coating process, and may thus serve to ensure the additional electrical conductivity.

The coating polymer may be contained in an amount of 0.001 to 10 parts by weight, and more preferably 0.005 to 5 parts by weight, with respect to 100 parts by weight of the lithium transition metal oxide contained in the mixture. As the coating polymer is mixed in the amount of 0.001 to 10 parts by weight with respect to 100 parts by weight of the lithium transition metal oxide, the coating layer may be uniformly formed in a film form on the entire surface of the positive electrode active material particle, and the coating layer thus formed may prevent mechanical breakage of the positive electrode active material that occurs by repetition of charge/discharge in a high voltage state.

The carbide, as a compound composed of carbon and another one element, may use at least one selected from the group consisting of $B_4C$, $Al_4C_3$, TiC, TaC, WC, NbC, HfC, VC and ZrC, and more preferably may be $B_4C$ or $Al_4C_3$.

The carbide, in which carbon and another element are covalently bonded, has a relatively high melting point, so that the carbide may remain as it is without being decomposed into $CO_2$ or CO even during the high temperature heat-treatment in the oxidizing atmosphere in the coating process, and also may be uniformly distributed and coated on the surface of the positive electrode active material particle, together with the coating polymer. Accordingly, the excellent electrical conductivity may be ensured, and this may cause the initial resistance and the increase rate of resistance to be reduced.

The carbide may be contained in an amount of 0.001 to 10 parts by weight, and more preferably 0.002 to 2 parts by weight, with respect to 100 parts by weight of the lithium transition metal oxide contained in the mixture. As the carbide is mixed in the amount of 0.001 to 10 parts by weight with respect to 100 parts by weight of the lithium transition metal oxide, the carbide may be uniformly distributed on the entire surface of the positive electrode active material particle, and this may cause the initial resistance and the increase rate of resistance to be reduced.

Meanwhile, the mixture may be prepared by adding and stirring the coating polymer to the lithium transition metal oxide, and thereafter adding and stirring the carbide, or alternatively prepared by adding and stirring the coating polymer and the carbide at the same time; however, the order of the preparing process is not particularly limited. The stirring process may be selectively performed in preparing the mixture, wherein the stirring speed may be 100 rpm to 2,000 rpm.

The mixture may include the coating polymer and the carbide at the weight ratio of 1:99 to 99:1, more preferably 20:80 to 80:20. Since the mixture contains the coating polymer and the carbide in the above weight ratio range, the coating layer in a film form may be uniformly formed on the entire surface of the positive electrode active material particle, and the carbide may be uniformly distributed. Accordingly, it is also possible to suppress the side-reaction with the electrolyte solution and the formation of the SEI (solid electrolyte interface) film on the surface of the positive electrode active material under a high voltage condition, thereby preparing the high voltage-resistant positive electrode active material with improved the resistance and life-time characteristics.

In sequence, the mixture is heat-treated to form the coating layer containing the carbonized coating polymer and the carbide on the surface of the lithium transition metal oxide particle.

The heat-treatment to form the coating layer may be performed under the oxidizing condition such as air or oxygen atmosphere, or under the inert condition such as nitrogen atmosphere, but more preferably performed under the oxidizing condition.

The heat-treatment may be performed at 200° C. to 800° C. for 0.5 to 5 hours, and more preferably performed at 300° C. to 600° C. for 0.5 to 5 hours.

The positive electrode active material for a secondary battery of the present invention thus prepared includes: a lithium transition metal oxide; and a coating layer formed on the surface of the lithium transition metal oxide particle, wherein the coating layer is formed in a film form, and the coating layer includes the carbonized coating polymer and the carbide.

The coating polymer used in the coating process may be formed into the carbonized coating layer through the heat-treatment during the coating process. Due to the carbonized coating polymer, the additional electrical conductivity may be ensured.

The carbide may remain as it is without being decomposed into $CO_2$ or CO during the high temperature heat-treatment in the oxidizing atmosphere in the coating process, and may also be formed into the coating layer with the coating polymer and be uniformly distributed on the surface of the positive electrode active material particle.

The coating layer may contain 0.001 to 10 parts by weight, and more preferably 0.002 to 2 parts by weight of the carbide with respect to 100 parts by weight of the lithium transition metal oxide particle. The carbide is not decomposed and removed even in the heat-treatment during the coating process thereby satisfying the above content range. Also, the carbide is contained within the above range, thereby ensuring the excellent electrical conductivity and reducing the initial resistance and the increase rate of resistance, so that the coating layer may be suitably applied for the high voltage-resistant positive electrode active material.

Kinds of the coating polymer and the carbide may be the same as those described above in the method for preparing the positive electrode active material for a secondary battery of the present invention.

The coating layer is formed in a film form which surrounds the surface of the lithium transition metal oxide particle, and the thickness of the coating layer may be 5 nm to 2,000 nm, and more preferably 10 nm to 500 nm. When the thickness of the coating layer is less than 5 nm, an extremely thin portion of the coating layer may be formed which makes it difficult to uniformly form the coating layer in a film form; and when the thickness of the coating layer is more than 2,000 nm, the ion conductivity may be lowered to lead to a problem in capacity deterioration.

According to the present invention, the positive electrode active material for a secondary battery, which is prepared by coating with the hybrid coating material, in which the coating polymer and the carbide are mixed, may suppress the side-reaction with the electrolyte solution and the formation of the SEI (solid electrolyte interface) film on the surface of the positive electrode active material under a high voltage condition, and thus may remarkably improve the resistance and life-time characteristics under a high voltage condition.

According to another embodiment of the present invention, there are provided a positive electrode for a secondary battery and a lithium secondary battery each including the positive electrode active material.

Particularly, the positive electrode includes a positive electrode current collector and a positive electrode active material layer, which is formed on the positive electrode current collector and contains the positive electrode active material.

In the positive electrode, the positive electrode current collector is not particularly limited as long as having electrical conductivity without causing any chemical changes in batteries. For example, the positive electrode current collector may include stainless steel, aluminum, nickel, titanium, sintered carbon, or aluminum; or may include stainless steel of which the surface is treated with carbon, nickel, titanium or silver, etc. In addition, the positive electrode current collector may have a thickness of 3 µm to 500 µm, and fine recesses and protrusions may be formed on the surface of the positive electrode current collector to improve the adhesion with the positive electrode active material. Various forms of the positive electrode current collector, for example, a film, a sheet, a foil, a net, a porous body, a foam body, a nonwoven fabric, etc. may be used.

The positive electrode active material layer may further include a conductive material and a binder in addition to the above-described positive electrode active material.

At the time, the conductive material is used for imparting conductivity to the electrode, and is not particularly limited as long as having electrical conductivity without causing any chemical changes in batteries. As specific examples of the conductive material, graphite (e.g., natural graphite or synthetic graphite); a carbon-based material (e.g., carbon black, acetylene black, ketjen black, channel black, furnace black, lamp black, summer black or carbon fiber); a metal powder or metal fiber (e.g., copper, nickel, aluminum or silver); a conductive whisker (e.g., a zinc oxide or a potassium titanate); a conductive metal oxide (e.g., a titanium oxide); or a conductive polymer (e.g., a polyphenylene derivative), and any one or a mixture of two or more thereof may be used. The conductive material may be typically contained in an amount of 1 wt % to 30 wt % with respect to the total weight of the positive electrode active material layer.

In addition, the binder serves to improve the adhesion between the positive electrode active material particles and the adhesive force between the positive electrode active material and the positive electrode current collector. Specific examples of the binder may include polyvinylidene fluoride (PVDF), a vinylidene fluoride-hexafluoropropylene copolymer (PVDF-co-HFP), a polyvinyl alcohol, polyacrylonitrile, carboxymethylcellulose (CMC), a starch, hydroxypropylcellulose, regenerated cellulose, polyvinylpyrrolidone, tetrafluoroethylene, polyethylene, polypropylene, an ethylene-propylene-diene polymer (EPDP), a sulfonated-EPDM, a styrene butadiene rubber (SBR), a fluorine rubber or various copolymers thereof, and any one or a mixture of two or more thereof may be used. The binder may be contained in an amount of 1 wt % to 30 wt % with respect to the total weight of the positive electrode active material layer.

The positive electrode may be prepared according to the typical positive electrode preparing method, except that the positive electrode uses the above-described positive electrode active material. Specifically, a positive electrode active material layer forming composition, which includes the above-described positive electrode active material and, optionally, the binder and the conductive material, may be applied on the positive electrode current collector, and then dried and rolled, thereby preparing the positive electrode. Here, the types and contents of the positive electrode active material, the binder and the conductive material are the same as described above.

Solvents typically used in the art may be used as the above-described solvent, and for example, a dimethyl sulfoxide (DMSO), an isopropyl alcohol, N-methylpyrrolidone (NMP), an acetone or water, etc., and any one or a mixture of two or more thereof may be used. It is sufficient only if an amount of the solvent to be used ensures a viscosity at which the positive electrode active material, the conductive material and the binder are dissolved and distributed in consideration of the coating thickness of the slurry and the manufacturing yield, and the excellent thickness uniformity may be exhibited in the subsequent coating process for preparing the positive electrode.

As an alternative method, the positive electrode may be prepared by casting the positive electrode active material layer forming composition on a separate supporter, and thereafter delaminating a film from the supporter and then laminating, on the positive electrode collector.

According to another embodiment of the present invention, there is provided an electrochemical device including the positive electrode. The electrochemical device may particularly be a battery, a capacitor, or the like, and more particularly, a lithium secondary battery.

The lithium secondary battery specifically includes a positive electrode, a negative electrode disposed to face the positive electrode, a separator interposed between the positive electrode and the negative electrode, and an electrolyte, wherein the positive electrode is the same as described above. In addition, the lithium secondary battery may optionally further include: a battery container for accommodating an electrode assembly of the positive electrode, the negative electrode and the separator; and a sealing member for sealing the battery container.

In the lithium secondary battery, the negative electrode includes a negative electrode current collector and a negative electrode active material layer disposed on the negative electrode current collector.

The negative electrode current collector is not particularly limited as long as having high conductivity without causing any chemical changes in batteries. For example, the negative electrode current collector may include copper, stainless steel, aluminum, nickel, titanium, sintered carbon, or copper; stainless steel of which the surface is treated with carbon, nickel, titanium or silver, etc.; or an aluminum-cadmium alloy. In addition, the negative electrode current collector may typically have a thickness of 3 µm to 500 µm, and as similar to the positive electrode current collector, fine recesses and protrusions may be formed on the surface of the current collector to strengthen the binding force of the negative electrode active material. Various forms of the negative electrode current collector, for example, a film, a sheet, a foil, a net, a porous body, a foam body, a nonwoven fabric, etc. may be used.

The negative electrode active material layer optionally includes a binder and a conductive material in addition to the negative electrode active material. The negative electrode active material layer may be prepared, for example, by coating the negative electrode current collector with a negative electrode forming composition including the negative electrode active material, and optionally, the binder and the conductive material, and thereafter drying the composition; or by casting a negative electrode forming composition on a separate supporter, and thereafter laminating, onto the negative electrode current collector, a film obtained by delaminating from the supporter.

A compound capable of reversible intercalation/deintercalation of lithium may be used as the negative electrode active material. As specific examples of the negative electrode active material, a carbonaceous material (e.g., artificial graphite, natural graphite, a graphitized carbon fiber, or amorphous carbon); a metallic compound capable of alloying with lithium (e.g., Si, Al, Sn, Pb, Zn, Bi, In, Mg, Ga, Cd, a Si alloy, a Sn alloy, or an Al alloy); a metal oxide capable of doping/un-doping lithium (e.g., $SiO_\beta$ ($0<\beta<2$), $SnO_2$, a vanadium oxide, or a lithium vanadium oxide); or a composite containing the metallic compound and the carbonaceous material (e.g., a Si—C composite or a Sn—C composite), and any one or a mixture of two or more thereof may be used. A metallic lithium thin film may also be used as the negative electrode active material. In addition, either low-crystalline carbon or high-crystalline carbon may be used as the carbon material. As typical examples of the low-crystalline carbon, soft carbon and hard carbon may be used, and as typical examples of the high-crystalline carbon, natural graphite or artificial graphite in a form of being amorphous, planar, scaly, spherical, or fibrous; Kish graphite; pyrolytic carbon; mesophase pitch-based carbon fibers; meso-carbon microbeads; mesophase pitches; and high-temperature sintered carbon (e.g., petroleum or coal tar pitch derived cokes) may be used.

Furthermore, the binder and the conductive material may be the same as above-described materials in the positive electrode.

Meanwhile, in the lithium secondary battery, the separator serves to separate the negative electrode and the positive electrodes from each other, and provide a transfer channel of lithium ions, and any separator may be used as the separator without particular limitation as long as typically used in a lithium secondary battery. Particularly, a separator having excellent electrolyte-retention ability as well as low resistance to transfer of the electrolyte ions may be preferably used for the separator. Specifically, a porous polymer film, for example, a porous polymer film formed of a polyolefin-based polymer (e.g., an ethylene homopolymer, a propylene homopolymer, an ethylene/butene copolymer, an ethylene/hexene copolymer, and an ethylene/methacrylate copolymer), or a laminated structure having two or more layers thereof may be used. A typical porous nonwoven fabric, for example, a nonwoven fabric formed of glass fibers or polyethylene terephthalate fibers, which have high melting points, may also be used. In addition, a coated separator containing a ceramic component or a polymer material may be used to ensure heat resistance or mechanical strength, and either a single-layer structure or a multilayer structure may be selectively used.

Furthermore, as examples of the electrolyte used in the present invention, an organic-based liquid electrolyte, an inorganic-based liquid electrolyte, a solid polymer electrolyte, a gel-type polymer electrolyte, a solid inorganic electrolyte, or a molten-type inorganic electrolyte, which is available in the preparation of the lithium secondary battery, may be used, but the present invention is not limited thereto.

Specifically, the electrolyte may include an organic solvent and a lithium-salt.

The organic solvent may be used without particular limitation as long as the organic solvent may serve as a medium through which ions involved in the electrochemical reaction of the battery may be transferred. Specifically, the organic solvent may include, for example, an ester-based solvent (e.g., methyl acetate, ethyl acetate, γ-butyrolactone, or ε-caprolactone); an ether-based solvent (e.g., dibutyl ether or tetrahydrofuran); a ketone-based solvent (e.g., cyclohexanone); an aromatic hydrocarbon-based solvent (e.g., benzene or fluorobenzene); a carbonate-based solvent (e.g., dimethylcarbonate (DMC), diethylcarbonate (DEC), methylethylcarbonate (MEC), ethylmethylcarbonate (EMC), ethylene carbonate (EC), or propylene carbonate (PC)); an alcohol-based solvent (e.g., ethyl alcohol or isopropyl alcohol); nitriles (e.g., R—CN, wherein R is a linear, branched, or cyclic hydrocarbon group having C2 to C20, and may contain double-bond aromatic ring(s) or ether-bond(s)); amides (e.g., dimethylformamide); dioxolanes (e.g., 1,3-dioxolane); or sulfolanes, etc. Among these examples, the carbonate-based solvent may be preferably used, and a mixture of the cyclic carbonate (e.g., ethylene carbonate or propylene carbonate), which has high ionic conductivity and high dielectric constant to increase charge/discharge performance of the battery, and the low-viscosity linear carbonate-based compound (e.g., ethylmethylcarbonate, dimethylcarbonate, or diethylcarbonate) may be more preferably used. In this case, when the cyclic carbonate and the chain carbonate are mixed at a volume ratio of about 1:1 to 1:9, the electrolyte solution may exhibit an excellent performance.

The lithium-salt may be used without particular limitation as long as the lithium-salt may be a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$, etc. may be used as the lithium-salt. The lithium-salt may be preferably used in a concentration range of 0.1 M to 2.0 M. When the concentration of the lithium-salt is included within the above range, the electrolyte has suitable conductivity and viscosity, thereby exhibiting excellent performance of the electrolyte and effectively transferring the lithium ions.

In addition to the electrolyte components, to improve life-time characteristic of the battery, suppress the reduction in battery capacity, and improve discharge capacity of the battery, the electrolyte may further include at least one additive consisting of, for example, a halo-alkylene carbonate-based compound (e.g., difluoroethylene carbonate), pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, an ammonium-salt, pyrrole, 2-methoxy ethanol, aluminum trichloride, or the like. In this case, the additive may be included in an amount of 0.1 wt % to 5 wt % with respect to the total weight of the electrolyte.

As described above, since the lithium secondary battery including the positive electrode active material according to the present invention stably exhibits the excellent discharge capacity, output characteristics and capacity retention rate, the lithium secondary battery is useful in portable devices (e.g., mobile phones, notebook computers, and digital cameras) and electric vehicle industries (e.g., hybrid electric vehicles (HEVs)).

Accordingly, according to another embodiment of the present invention, there are provided a battery module including the lithium secondary battery as a unit cell and a battery pack including the same.

The battery module or the battery pack may be used as a power source of a medium- or large-sized device for at least one among a power tool; electric vehicles including an electric vehicle (EV), a hybrid electric vehicle and a plug-in hybrid electric vehicle (PHEV); or a power storage system.

Hereinafter, the present invention will be described in more detail according to examples. However, the invention may be embodied in many different forms and should not be construed as being limited to the embodiments set forth herein.

Example 1

$LiNi_{0.6}Co_{0.2}Mn_{0.2}O_2$, polyvinylidene fluoride (PVDF), and $B_4C$ as carbide were mixed at a weight ratio of 100:2:0.1, and the mixture was heat-treated at 400° C. for about 3 hours in an oxygen atmosphere, thereby obtaining a coating layer formed on the surface of the $LiNi_{0.6}Co_{0.2}Mn_{0.2}O_2$ particle.

Example 2

A coating layer was prepared in the same manner as in Example 1, except that $Al_4C_3$ was mixed instead of $B_4C$ as carbide.

Example 3

A coating layer was prepared in the same manner as in Example 1, except that polyvinyl pyrrolidone (PVP) was mixed instead of polyvinylidene fluoride (PVDF) as a coating polymer.

Example 4

$LiNi_{0.6}Co_{0.2}Mn_{0.2}O_2$, polyvinylidene fluoride (PVDF), and $B_4C$ as carbide were mixed at a weight ratio of 100:0.2:0.5, and the mixture was heat-treated at 400° C. for about 3 hours in an oxygen atmosphere, thereby obtaining a coating layer formed on the surface of the $LiNi_{0.6}Co_{0.2}Mn_{0.2}O_2$ particle.

Comparative Example 1

$LiNi_{0.6}Co_{0.2}Mn_{0.2}O_2$, on which a coating layer was not formed, was provided.

Comparative Example 2

$LiNi_{0.6}Co_{0.2}Mn_{0.2}O_2$ and $H_3BO_3$ were mixed at a weight ratio of 100:0.1, and the mixture was heat-treated at 400° C. for about 3 hours in an oxygen atmosphere, thereby obtaining a coating layer formed on the surface of the $LiNi_{0.6}Co_{0.2}Mn_{0.2}O_2$ particle.

Comparative Example 3

$LiNi_{0.6}Co_{0.2}Mn_{0.2}O_2$, polyvinylidene fluoride (PVDF), and carbon black were mixed at a weight ratio of 100:2:0.1, and the mixture was heat-treated at 400° C. for about 3 hours in an oxygen atmosphere, thereby obtaining a coating layer formed on the surface of the $LiNi_{0.6}Co_{0.2}Mn_{0.2}O_2$ particle.

The coating layer thus formed has am extremely non-uniform thickness, and any carbon black was not detected from the coating layer. It is thought that this is because the carbon black is decomposed and removed into $CO_2$ or CO during the heat-treatment process.

Comparative Example 4

$LiNi_{0.6}Co_{0.2}Mn_{0.2}O_2$ and $B_4C$ were mixed at a weight ratio of 100:0.1, and the mixture was heat-treated at 400° C. for about 3 hours in an oxygen atmosphere, thereby obtaining a coating layer formed on the surface of the $LiNi_{0.6}Co_{0.2}Mn_{0.2}O_2$ particle.

Comparative Example 5

$LiNi_{0.6}Co_{0.2}Mn_{0.2}O_2$ and polyvinylidene fluoride (PVDF) were mixed at a weight ratio of 100:2, and the mixture was heat-treated at 400° C. for about 3 hours in an oxygen atmosphere, thereby obtaining a coating layer formed on the surface of the $LiNi_{0.6}Co_{0.2}Mn_{0.2}O_2$ particle.

Experimental Example 1: Observation of Positive Electrode Active Material

Figure 2:
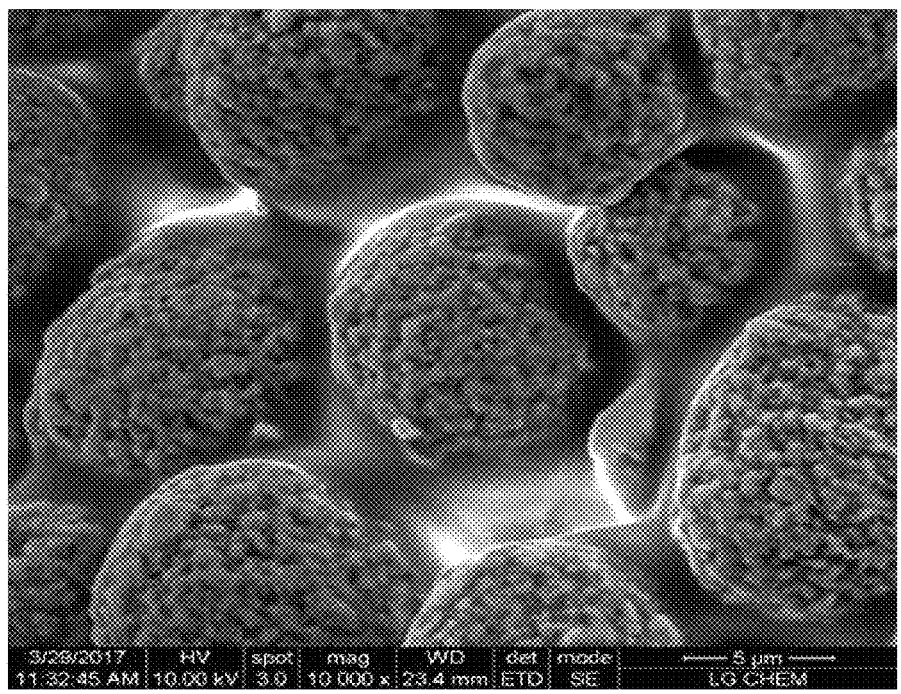
Figure 3:
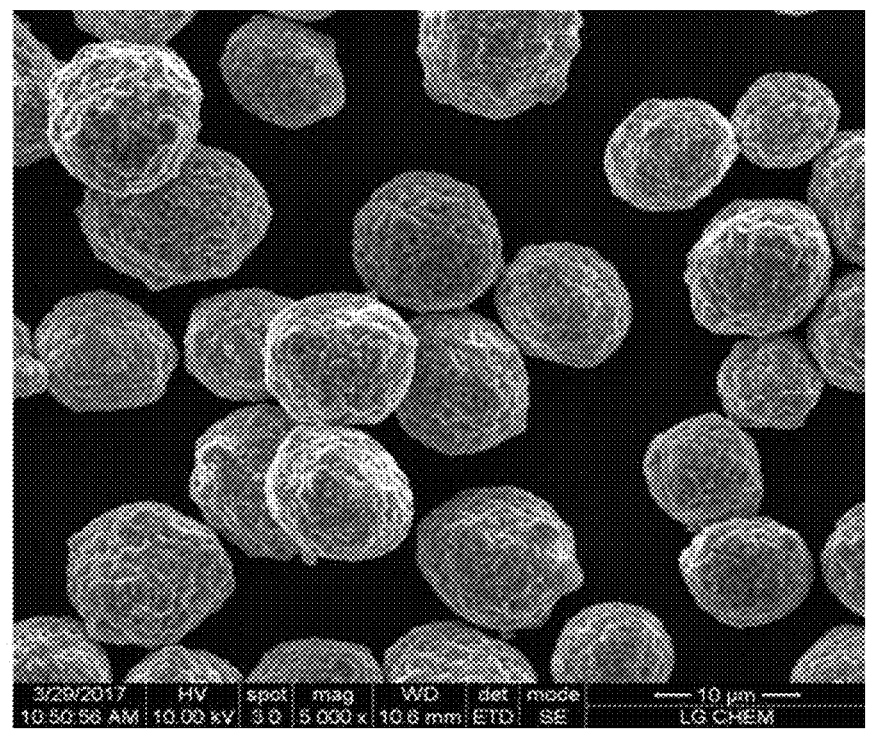
FIGS. 3 and 4 are scanning electron microscope (SEM) images of a positive electrode active material prepared in Comparative Example 2 on an enlarged scale.
Figure 4:
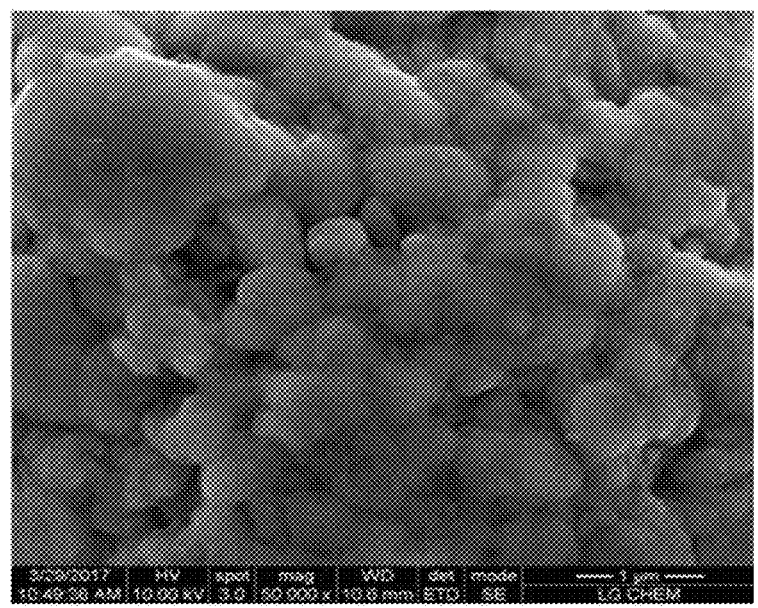

Photographs of the positive electrode active material prepared in Example 1 and Comparative Example 2, which are magnified and observed by a scanning electron microscope (SEM), are respectively shown in FIGS. 1 and 2 (Example 1) and FIGS. 3 and 4 (Comparative Example 2).

Referring to FIGS. 1 and 2, in Example 1 prepared by coating with a coating polymer and carbide as a hybrid coating material, it could be confirmed that the coating layer in a film form surrounding the surface of the active material particle was formed with an average thickness of 1,000 nm.

Referring to FIGS. 3 and 4, in Comparative Example 2 coated with a typical coating material, i.e., $H_3BO_3$, it could be confirmed that the coating portion in an island form, not in a film form, was formed on the surface of the active material particle.

Experimental Example 2: Evaluation of High Voltage Cycle Characteristic

The positive electrode active materials prepared in Examples 1 to 4 and Comparative Examples 1 to 5, carbon black, and a PVDF binder were mixed at a weight ratio of 96:2:2 in an N-methylpyrrolidone solvent to prepare a positive electrode forming composition, and the composition thus prepared was coated on one surface of an aluminum current collector, followed by being dried at 130° C. and rolled to thereby prepare positive electrodes.

Also, natural graphite as a negative electrode active material, carbon black as a conductive material, and a PVDF binder were mixed in at a weight ratio of 85:10:5 in an N-methylpyrrolidone solvent to prepare a negative electrode forming composition, and the composition thus prepared was coated on one surface of a copper current collector to thereby prepare a negative electrode.

A porous polyethylene separator was interposed between the positive electrode and the negative electrode that had been prepared as described above, to manufacture an electrode assembly, and the electrode assembly was positioned inside a case thereof, followed by injecting an electrolyte solution into the case to manufacture a lithium secondary battery. In this case, the electrolyte solution was prepared by dissolving a 1.0 M of lithium hexafluorophosphate ($LiPF_6$) in an organic solvent composed of ethylene carbonate/dimethylcarbonate/ethylmethylcarbonate (mixed volume ratio of EC/DMC/EMC=3/4/3).

Each full cell of the lithium secondary battery manufactured as described above was charged in a CCCV mode at 25° C. and 45° C. until reaching 0.7 C and 4.4 V, cut off under a 0.55 C condition, and then discharged at a 0.5 C constant current until reaching 3.0 V. The capacity retention (%) was measured while performing charge/discharge 100 times in such a manner, and the results are shown in Table 1.

TABLE 1

| | Capacity retention after 100 cycles (%) | |
|---|---|---|
| | 25° C. | 45° C. |
| Example 1 | 98.6 | 95.7 |
| Example 2 | 95.3 | 93.0 |
| Example 3 | 97.7 | 94.8 |
| Example 4 | 98.1 | 95.6 |
| Comparative Example 1 | 90.4 | 88.1 |
| Comparative Example 2 | 91.4 | 90.5 |
| Comparative Example 3 | 91.0 | 88.4 |
| Comparative Example 4 | 91.2 | 90.6 |
| Comparative Example 5 | 92.7 | 90.8 |

Referring to Table 1, it could be confirmed that Examples 1 to 4 prepared by coating with a coating polymer and carbide as a hybrid coating material exhibited more excellent cycle characteristics at room temperature (25° C.) and high temperature (45° C.) under a high voltage condition than both Comparative Example 1 which was not coated, and Comparative Example 2 which was coated with a typical coating material, i.e., $H_3BO_3$. In addition, it could also be confirmed that in Examples 1 to 4, the cycle characteristics were remarkably more excellent than Comparative Example 3 prepared by coating with a polymer and carbon (carbon black) as a coating material.

Furthermore, it could be confirmed that in Comparative Example 4 prepared by coating with $B_4C$ as single coating material, the cycle characteristics, at room temperature (25° C.) and high temperature (45° C.), were lower than in Examples 1 to 4, and were similar to Comparative Example 2. It could also be confirmed that in Comparative Example 5 prepared by coating with PVDF as single coating material, the cycle characteristics, at room temperature (25° C.) and high temperature (45° C.), were remarkably lower than in Examples 1 to 4.

Experimental Example 3: Evaluation of Cell Resistance Under High Voltage Condition Each full cell of the lithium secondary battery manufactured as described above was charged according to a CCCV mode respectively at 25° C. and 45° C. until reaching 0.7 C and 4.4 V, cut off under a 0.55 C condition, and then discharged at a 0.5 C constant current until reaching 3.0 V. The rate of resistance increase (DCIR, %) was measured while performing charge/discharge 100 times in such a manner, and the results are shown in Table 2.

TABLE 2

| | Rate of resistance increase after 100 cycles (%) | |
|---|---|---|
| | 25° C. | 45° C. |
| Example 1 | 14 | 25 |
| Example 2 | 13 | 27 |
| Example 3 | 18 | 30 |
| Example 4 | 17 | 22 |
| Comparative Example 1 | 32 | 51 |
| Comparative Example 2 | 29 | 48 |
| Comparative Example 3 | 31 | 49 |
| Comparative Example 4 | 25 | 43 |
| Comparative Example 5 | 35 | 52 |

Referring to Table 2, it could be confirmed that Examples 1 to 4 prepared by coating with a coating polymer and carbide as a hybrid coating material exhibited remarkably lower increase rates of resistance at room temperature (25° C.) and high temperature (45° C.) under a high voltage condition than Comparative Example 1 which was not coated, and Comparative Example 2 which was coated with a typical coating material, i.e., $H_3BO_3$. It could also be confirmed that in Examples 1 to 4, the resistance characteristics were remarkably superior to Comparative Example 3 prepared by coating with a polymer and carbon (carbon black) as a coating material.

Furthermore, it could be confirmed that in Comparative Example 4 prepared by coating with $B_4C$ as single coating material, the rates of resistance increase were higher than in Examples 1 to 4. It is considered that this is because the rates of resistance increase are decreased due to improvement of the surface electrical conductivity and suppression of the side-reactant formation by the uniform coating of the polymer-carbide in Examples 1 to 4, and the uniform coating is not formed on the surface of the positive electrode active material when coated with single carbide having electrical conductivity as shown in Comparative Example 4.

In addition, it could also be confirmed that when coated with single PVDF in Comparative Example 5, relatively the higher rates of resistance increase were exhibited, and it is considered that this is because the rates of resistance increase continuously increase during charging/discharging in addition to the initial resistance increase of the polymer itself.

The invention claimed is:

1. A positive electrode active material for a secondary battery, the positive electrode active material comprising:
    a lithium transition metal oxide particle; and
    a coating layer formed on a surface of the lithium transition metal oxide particle,
    wherein the coating layer is formed in a film form,
    wherein the coating layer has a thickness from 15-2,000 nm, and
    the coating layer includes a carbonized coating polymer and carbide, wherein the lithium transition metal oxide particle has a layered structure or a spinel structure.

2. The positive electrode active material of claim 1, wherein the coating polymer is at least one selected from the group consisting of polyvinylidene fluoride (PVDF), polyvinylpyrrolidone, polyethylene, polystyrene, polyethylene terephthalate, polyvinyl chloride, polyvinylidene chloride, an epoxy resin, an amino resin, a phenol resin, and a polyester resin.

3. The positive electrode active material of claim 1, wherein the coating polymer is at least one selected from the group consisting of polyvinylidene fluoride (PVDF), polyvinylpyrrolidone, polyethylene terephthalate, and polyvinylidene chloride.

4. The positive electrode active material of claim 1, wherein the carbide is at least one selected from the group consisting of $B_4C$, $Al_4C_3$, TiC, TaC, WC, NbC, HfC, VC, and ZrC.

5. The positive electrode active material of claim 1, wherein the carbide is $B_4C$ or $Al_4C_3$.

6. The positive electrode active material of claim 1, wherein the carbide is present in an amount of 0.001 to 10 parts by weight with respect to 100 parts by weight of the lithium transition metal oxide particle.

7. A positive electrode for a secondary battery, the positive electrode comprising the positive electrode active material of claim 1.

8. A lithium secondary battery comprising the positive electrode of claim 7.

9. The positive electrode active material of claim 1, wherein the lithium transition metal oxide particle comprises $LiCoO_2$, $LiNiO_2$, $LiMn_2O_4$, or a lithium transition metal composite oxide represented by following formula 1:

$$Li_pNi_{1-x-y}Co_xM^a_yM^b_zO_2 \qquad \text{[formula 1]}$$

where $M^a$ is at least one element selected from the group consisting of Mn, Al or Zr, $M^b$ is at least one element selected from the group consisting of Al, Zr, Ti, Mg, Ta, Nb, Mo, W or Cr, and $0.9 \le p \le 1.5$, $0 \le x \le 0.5$, $0 \le y \le 0.5$ and $0 \le z \le 0.1$ are satisfied.

10. The positive electrode active material of claim 1, wherein the coating layer has the thickness from 1,000-2,000 nm.

11. The positive electrode active material of claim 1, wherein the coating layer has a ratio of the carbonized coating polymer to the carbide in a range from 20:80 to 80:20.

* * * * *